April 14, 1953  W. P. TAYLOR, JR  2,634,922
PACKAGE
Filed July 28, 1949  6 Sheets-Sheet 1
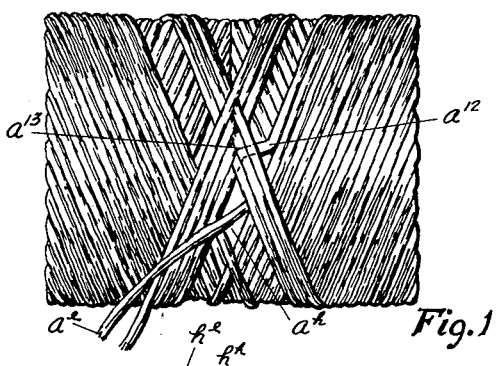
Fig. 1
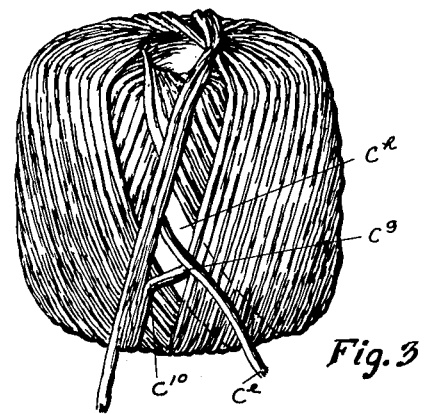
Fig. 3
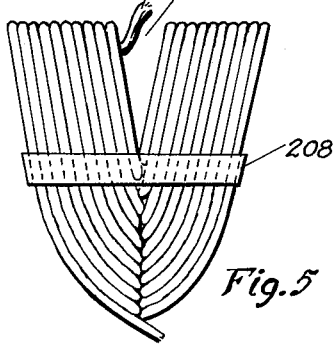
Fig. 5
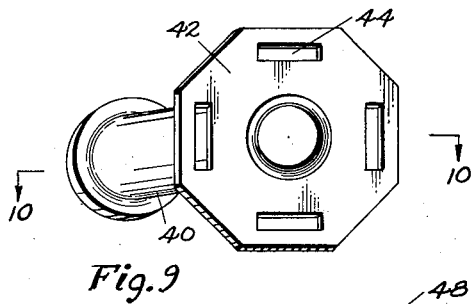
Fig. 9
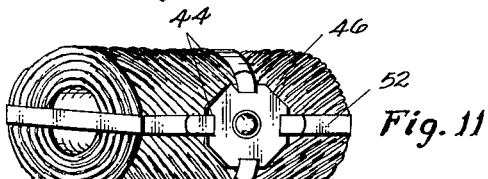
Fig. 11
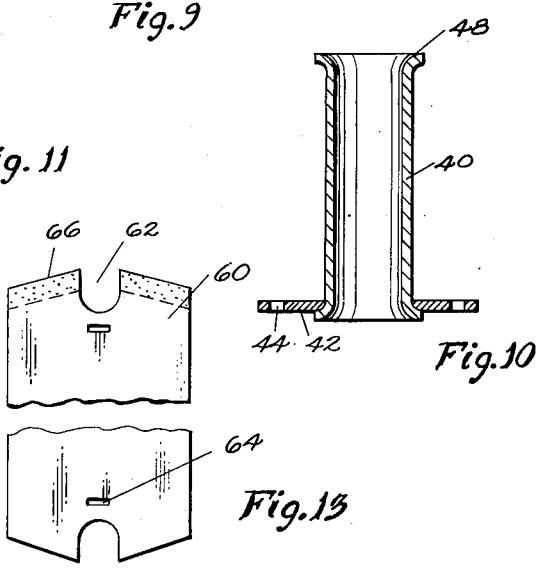
Fig. 10
Fig. 13
Fig. 14
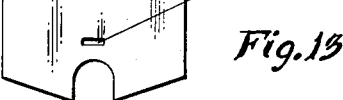
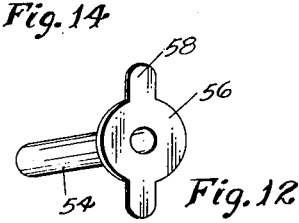
Fig. 12
INVENTOR.
Walter P. Taylor, Jr.
BY
Bailey, Stephens & Huettig
ATTORNEYS April 14, 1953 W. P. TAYLOR, JR 2,634,922
PACKAGE
Filed July 28, 1949 6 Sheets-Sheet 2

INVENTORS
Walter P. Taylor, Jr.

By
Bailey, Stephens & Huettig
ATTORNEYS

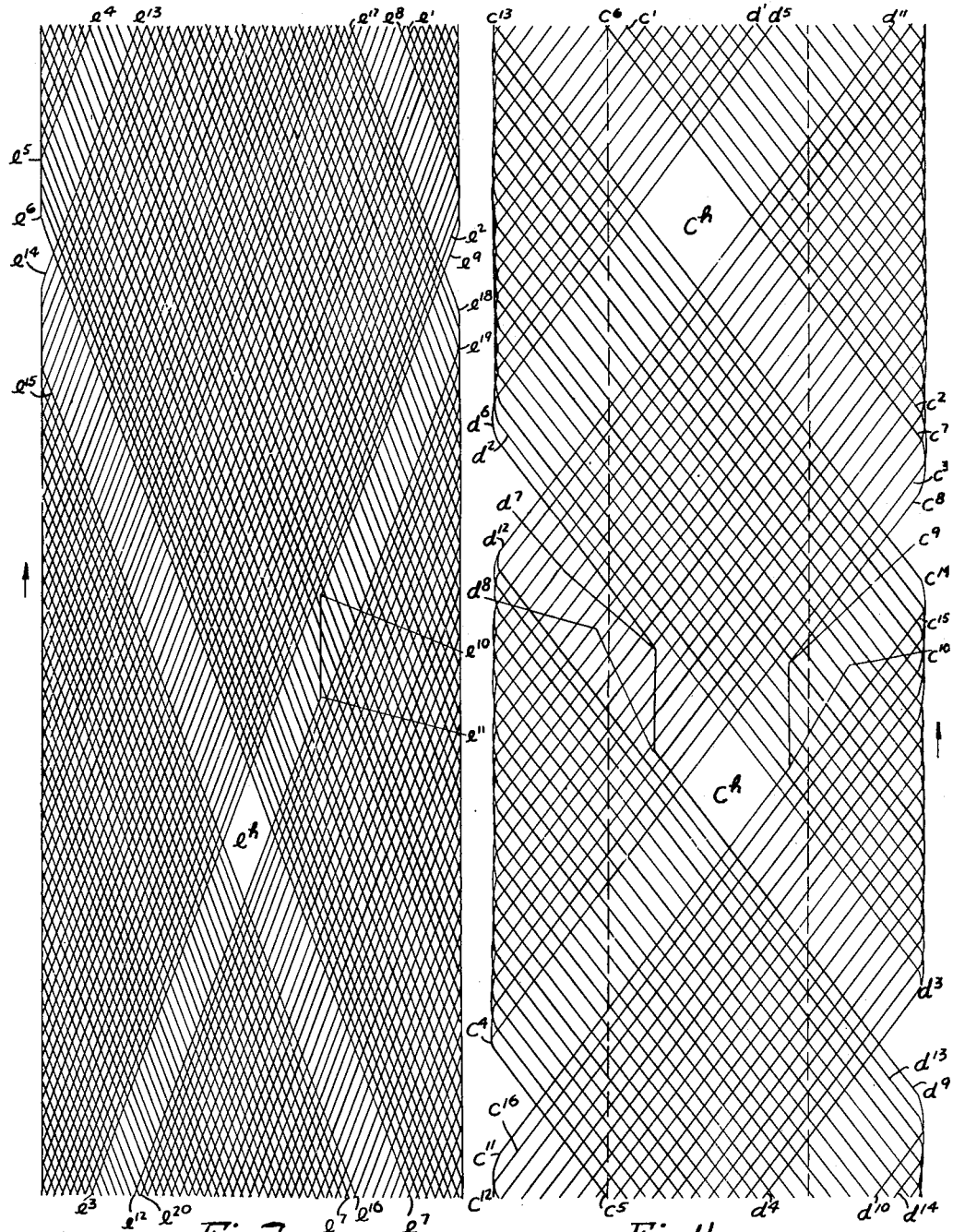

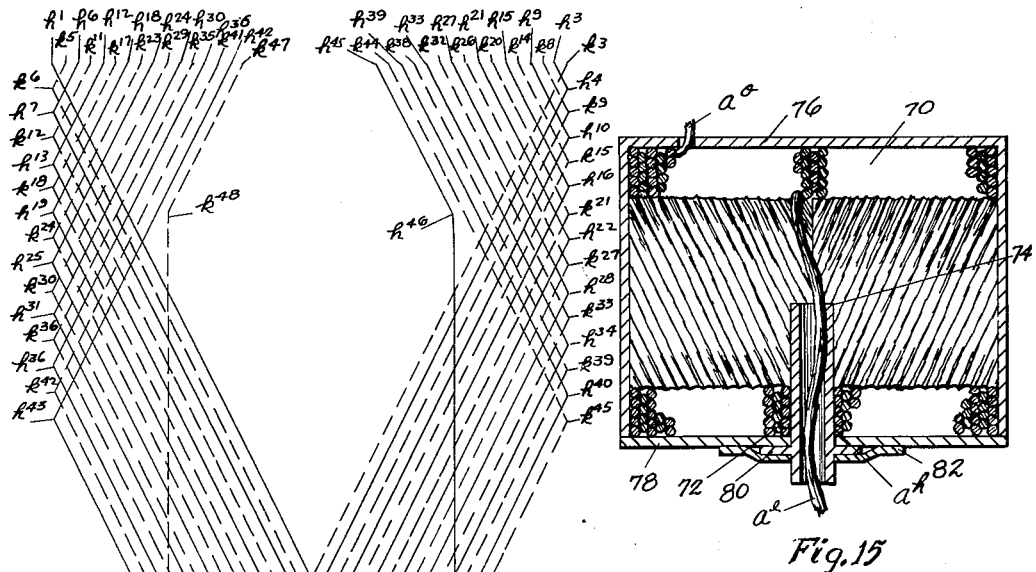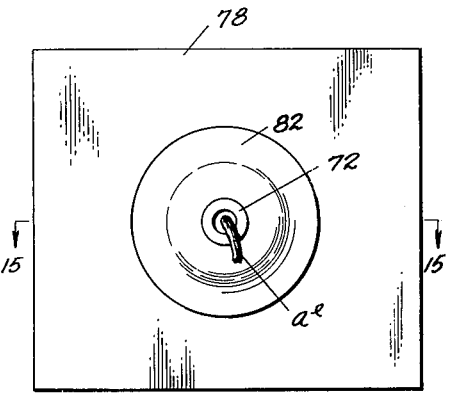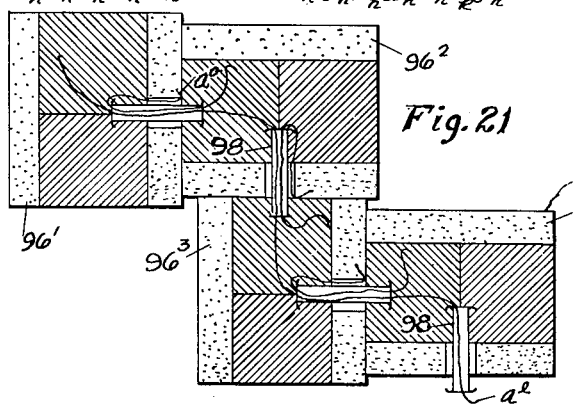

April 14, 1953   W. P. TAYLOR, JR   2,634,922
PACKAGE
Filed July 28, 1949   6 Sheets-Sheet 5
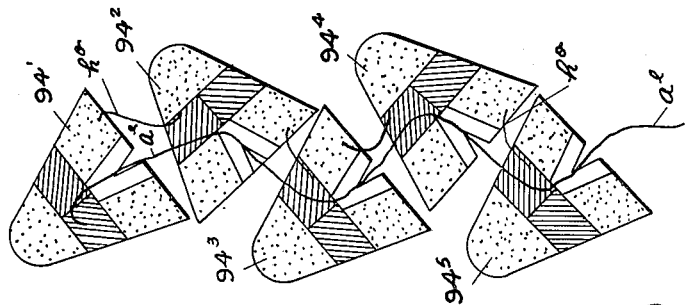
Fig. 20
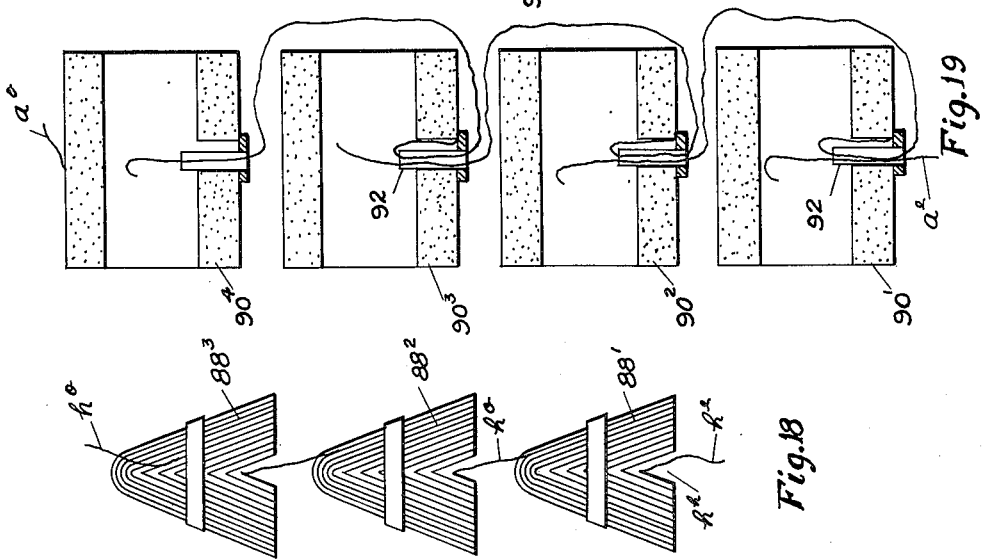
Fig. 19
Fig. 18
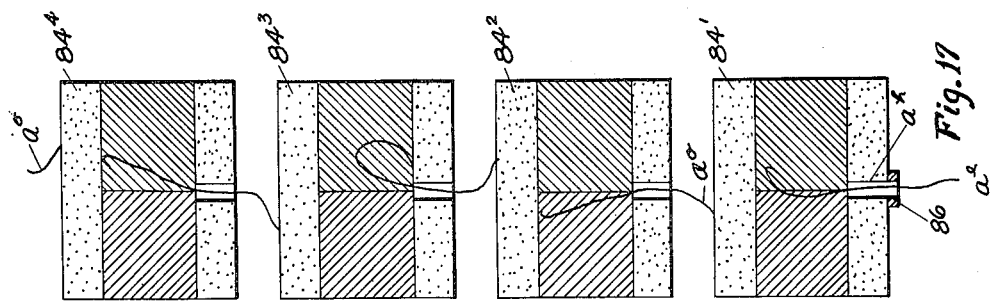
Fig. 17
INVENTOR.
Walter P. Taylor, Jr.
BY
Bailey, Stephens & Huettig
ATTORNEYS April 14, 1953  W. P. TAYLOR, JR  2,634,922
PACKAGE Filed July 28, 1949  6 Sheets—Sheet 6

INVENTOR.
Walter P. Taylor, Jr.
BY
Bailey, Stephens & Huettig
ATTORNEYS

Patented Apr. 14, 1953

2,634,922

UNITED STATES PATENT OFFICE 2,634,922

PACKAGE

Walter P. Taylor, Jr., New York, N. Y.

Application July 28, 1949, Serial No. 107,165

21 Claims. (Cl. 242—159)

The invention relates to packages of flexible material, and especially of such materials as wire, yarn, thread, rope, ribbon, tape and the like.

The primary object of the invention is to provide a package of flexible material from which the material can be rapidly withdrawn without kinking or twisting. In my prior application entitled "Winding," Serial Number 693,441, filed August 28, 1946, there has been described such a package, as well as a machine for forming it, the package having an unobstructed opening therethrough formed by the spindle of the machine on which the package is wound and having a hole radial to such opening through which the inner end of the material is withdrawn. In such a package, kinking and snarling of the material is prevented, without its being necessary to mount the package on a reel or otherwise to rotate it during withdrawal of the flexible material.

The package formed as described in this earlier application is suitable for many uses, but has some disadvantages for certain purposes. In the earlier package, the portions of certain of the coils at the point where the hole is formed are displaced so as to overlie other coils of the same layer, so that there is a tendency to build up a bulge at this point around the hole. The package may be somewhat unsightly by reason of this bulge, and the overlapping of the coils may at times damage the wound substance through pressure at this point.

The present invention contemplates the production of a package in which the overlapping of the coils in the same layer is avoided, and the consequent disadvantages of the earlier package are overcome. More particularly, the new package is preferably formed of a plurality of layers each formed of a plurality of helical coils laid successively around the package, each coil preferably crossing the next preceding coil intermediate the ends of the body, with the crossing points successively angularly spaced around the body. Between certain of the coils a wider spacing is provided, at the same angular position in each layer, so that, where the gaps so formed cross each other, a hole will be left radially into the core opening of the package. The package so formed then has an unobstructed core opening and a radial hole built into the coil by the winding thereof, without the formation of a bulge by the displacement of coils of the same layer to overlie each other at the sides of the hole. In fact, the package produced according to the present invention may have shallow helical valleys therearound, although the appearance of these valleys may be greatly minimized in the manner to be described hereinafter.

The package of the present invention may be produced in various ways. A machine for its production is described in an application of Walter P. Taylor, Jr., and Jack Van Horn Whipple, entitled "Winding Machine," Serial No. 107,166 filed July 28, 1949. This machine includes a spindle which is rotated to wind the flexible material thereon, and a guide which is moved back and forth along the spindle to form layers each including a series of helical coils of the flexible material on the spindle. The movements of the spindle and guide are slightly out of phase, so that the crossing points of the helices of each layer are successively angularly displaced around the package. This displacement is referred to as the advance, which may be either positive or negative, depending on the relative speeds of the guide and spindle. For example, if the guide makes about one complete reciprocation for each two rotations of the spindle (hereinafter referred to as a "one" wind, the number "one" being the ratio between the number of rotations of the spindle and twice the number of complete oscillations of the guide), the speed adjustment might be such that, for each sixty revolutions of the spindle, the guide would make twenty-nine complete oscillations (positive advance) or thirty-one complete oscillations (negative advance), or some fractional number close to thirty. The angular displacement between successive crossovers in such an arrangement would then be about twelve degrees.

According to the present invention, this advance is greatly increased at one point, so that the angular spacing between the crossovers is substantially greater, and the lineal distance between the successive helices is also much greater. This is accomplished by varying the relative speed of the spindle and guide at least once during the formation of each layer, and at the same angular position in successive layers. The result is to form one or more "valleys" designating a strip from which one of the two sets of crossing lengths of flexible material is absent. Where two of such valleys cross, there will be an absence of both sets, so that a hole will be formed in the wall of the package. The holes in successive layers are made to overlap, so that a passage or hole is produced extending substantially radially from the opening formed by the spindle on which the package is formed to the outside.

By leading the inner end of the wire out through the hole thus formed, the successive lengths of flexible material can be drawn out of the package without substantial twist. In the preferred form of the invention, using an integral numbered wind, for example a "one" wind, the hole is at the longitudinal center of the package, which is formed of a series of lengths each in the form of a figure 8. Since the hole is at the center, the bights of the figure 8 are on opposite sides, and the twists on opposite sides of the hole are equal. As each bight is withdrawn, it compensates the opposite twist of the preceding or following bight, so that there is no substantial twist in the wire at anytime. With other winds, such as a "one and one-half" wind, there may be more material in the bight or bights on one side of the opening than on the other, but when such packages are formed with two valleys a central opening can be obtained.

A further object of the invention is to provide a dispensing arrangement including a package of the type hereinabove described, or some package in which a space is provided radial to the spindle core through which the inner end of the flexible material is led out between the two oppositely twisted bights of the figure 8 lengths. In this aspect of the invention, a package such as that described in my earlier application S. N. 693,441 may be used.

I have found that the wire or other flexible material may be withdrawn more readily from a package of this type if there be inserted through the hole a guiding member (such as a tube) which has an annular guiding surface within the spindle core hole spaced inwardly from the innermost layer of the flexible material. This tube must be of substantially greater internal area than the cross-section of the flexible material, so as to avoid substantial frictional drag thereon.

Another object of the invention lies, then, in the facilitating of the withdrawal of the wire by such a guide member.

Still another object of the invention is to provide an arrangement for protecting the parts of the flexible material around the radial hole from damage by the friction of the material being withdrawn through the hole. More particularly, the invention contemplates obtaining this result by the use of the tube referred to above, which also acts to furnish the guiding surface within the core space.

A further object of the invention is to provide an arrangement by which a series of such packages formed of a single continuous strip or filament of flexible material may be withdrawn one after the other with at most only slight additional friction.

Still another object of the invention is to provide a dispensing arrangement, for holding the tube in the package and for protecting the package. By fitting a holder tightly around the package and mounting the tube in this holder, strong support will be furnished to the package during the whole withdrawal operation. This is because the material is withdrawn from the innermost coil, so that the outer layer remains in being until the end of the withdrawal. Thus the package tends to maintain its shape and function properly until it is completely used up.

Further objects and advantages of the invention will appear more fully from the following description, especially when taken in conjunction with the accompanying drawings which form a part thereof.

In the drawings:

Figs. 1, 3 and 5 show in side elevation, in perspective, and in side elevation, respectively three types of package embodying my invention;

Figs. 2, 4 and 6 are winding diagrams of the packages of Figs. 1, 3 and 5, respectively.

Figs. 7 and 8 are winding diagrams of other types of packages;

Fig. 9 shows in perspective a part for use in one dispensing arrangement;

Fig. 10 is a cross-section on the line 10—10 of Fig. 9;

Fig. 11 shows a package provided with the arrangement of Fig. 9;

Fig. 12 is a perspective view of a part used in another dispensing arrangement;

Fig. 13 is a side elevation of another part used in this arrangement;

Fig. 14 shows a package supplied with the parts of Figs. 13 and 12;

Fig. 15 is a cross-section, substantially on the line 15—15 of Fig. 16, of another dispensing arrangement;

Fig. 16 is a front view of arrangement of Fig. 15;

Figs. 17 to 21 are diagrams showing the withdrawal of a plurality of connected packages;

Figures 2, 8:
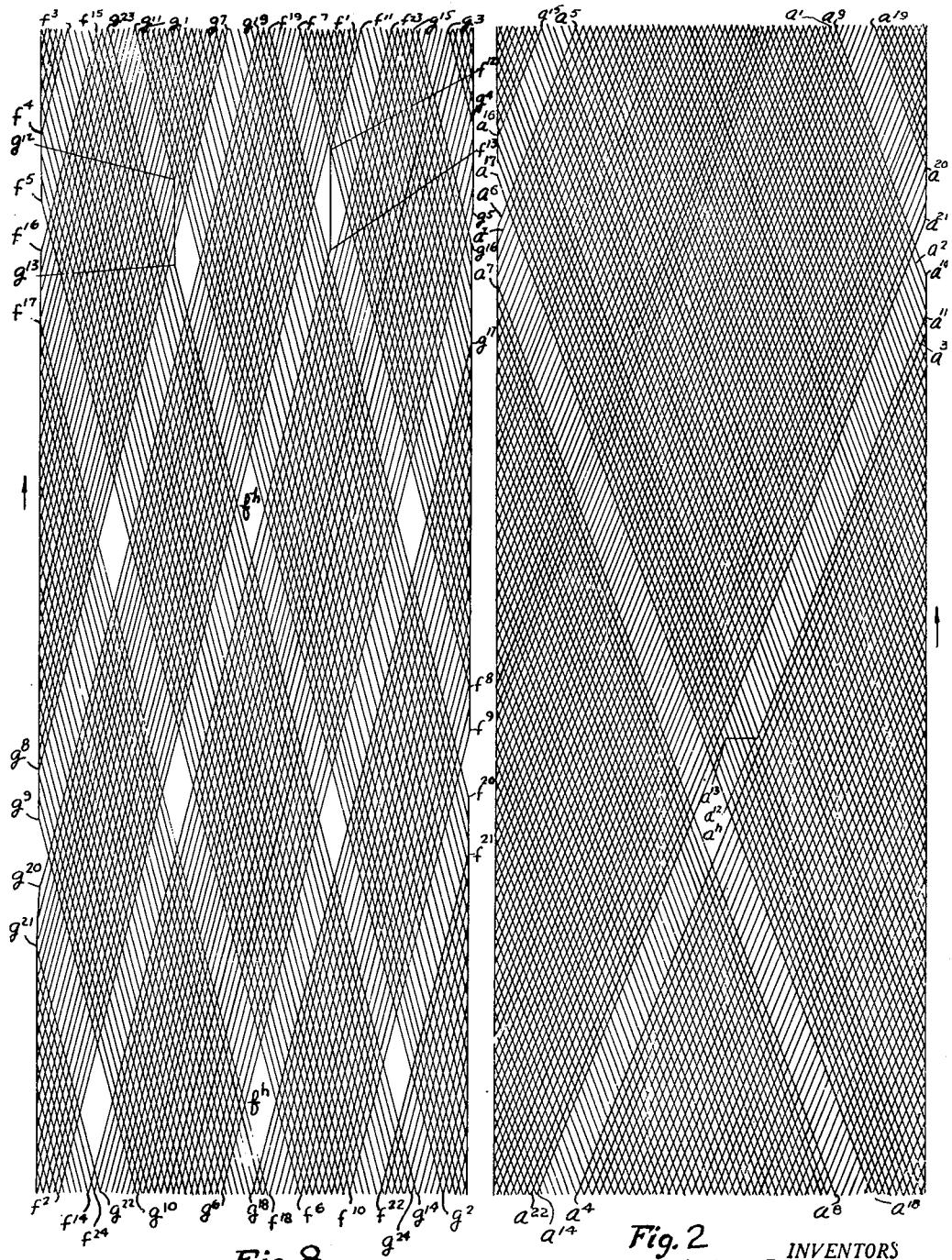

The machine as described in the application of Walter P. Taylor, Jr., and Jack Van Horn Whipple, referred to above, has a spindle and a guide, with a clutch in the driving mechanism of the guide; although the clutch may, for a negative wind, be applied in the spindle drive.

This machine is set so that for each selected number of revolutions of the spindle the guide will make a number of complete reciprocations which is only slightly different from an integral multiple of one half of the number of revolutions of the spindle.

In the absence of the clutch mechanism, or some other arrangement for producing temporary differences in relative speed between the guide and spindle, the operation of such a machine would then produce on the spindle the ordinary universal wind, that is, a series of layers of helical coils extending from end to end of the package and having the crossovers of successive coils evenly angularly spaced around the package.

Figs. 1 to 8 show types of packages which are produced according to the present invention, either by the operation of the machine hereinbefore referred to with the clutch mechanism in operation or in any other suitable fashion.

With reference to Fig. 7 there is shown a winding diagram of a package produced with a "one" wind and a positive advance utilizing the stopping of the guide to produce the hole. In this diagram, a layer is shown which may be considered to start at $e^1$. The spindle is turning in the direction of the arrow, and the guide is moving from left to right. At $e^2$, the guide reaches the end of its travel along the spindle and starts back towards the left, to $e^3$. Point $e^4$ is the same as $e^3$, and this coil ends at $e^5$. The guide now starts back towards the right at $e^6$, continuing to $e^7$ (and the same point $e^8$) and then to $e^9$, where travel to the left starts again. At a point during this travel, as at $e^{10}$, the movement of the guide is stopped for a predetermined angular movement of the spindle which is preferably an exact multiple of the angle of advance. When this occurs, the spindle, continuing to turn, will wind the flexible material straight around it (vertically in Fig. 7) to the point $e^{11}$. At this point, reciprocation of the guide is resumed, and the material runs to $e^{12}$, $e^{13}$ (the same point as $e^{12}$) $e^{14}$, then starts back at $e^{15}$ to $e^{16}$, $e^{17}$ (the same point as $e^{16}$), $e^{18}$, then back at $e^{19}$ to $e^{20}$. The remainder of the layer is then completed without further interruption of the guide, laying successive coils side by side with substantially equal spacing therebetween.

There results thus a sort of gutter or valley extending spirally twice around the spindle. This gutter is defined by the lines joining points $e^8$, $e^9$, $e^{10}$, $e^3$, $e^4$, $e^5$, $e^6$, $e^7$ on one side and by the lines joining points $e^{17}$, $e^{18}$, $e^{19}$, $e^{11}$, $e^{12}$, $e^{13}$, $e^{14}$, $e^{15}$, $e^{16}$ on the other. The two spirals of this gutter intersect at $e^h$. Since each gutter section contains only the parts running transversely of the gutter, a hole will be formed at this intersection.

Successive layers of the same type, or of other winds if desired, are laid on the spindle. Of course, the holes in successive layers are caused to overlie each other, at least to a great extent, so that the package as finally produced has a generally radially directed opening into the spindle core hole.

Fig. 1 shows a package produced by stopping the spindle while the guide continues to move, and Fig. 2 is the winding diagram of such a package.

The package shown is formed with a single interruption of the spindle movement, with a negative advance and a "one" wind. It is assumed that the guide will normally operate at a speed corresponding to 30 reciprocations in each direction for each 59 rotations of the spindle. The spindle turns in the direction of the arrow (Fig. 2).

Starting from a point $a^1$, at which the guide is moving towards the right, the material is laid to $a^2$, reverses at $a^3$, and continues at $a^4$, $a^5$ (which is the same as $a^4$), and $a^6$. It reverses at $a^7$, runs to $a^8$, $a^9$ (the same as $a^8$), to $a^{10}$, reverses at $a^{11}$ and runs to $a^{12}$. At this point, rotation of the spindle is stopped and the guide continues, laying the material lengthwise of the spindle to $a^{13}$, where rotation of the spindle resumes. The material is then laid to $a^{14}$, $a^{15}$ (which is the same), $a^{16}$, reverses at $a^{17}$, to $a^{18}$, $a^{19}$, (which is the same), $a^{20}$, and reverses at $a^{21}$ to $a^{22}$. The remainder of the layer is then laid with substantially equal spacing.

This produces a valley marked out by a first line $a^5$, $a^6$, $a^7$, $a^8$, $a^9$, $a^{10}$, $a^{11}$, $a^{12}$, $a^4$; and by a second line $a^{15}$, $a^{16}$, $a^{17}$, $a^{18}$, $a^{19}$, $a^{20}$, $a^{21}$, $a^{13}$, $a^{14}$. The valley forms two spirals around the package crossing and forming the hole $a^h$ at the longitudinal center thereof. The end $a^e$ of the flexible material is led out through this hole.

Figs. 3 and 4 show a package of wire or the like and the winding diagram of one layer of this package. This package is formed with a "one-half wind" and with a positive advance. Two interruptions if the spindle shaft take place in each cycle. Starting at a point such as $c^1$, the guide is moving towards the right as the spindle turns in the direction of the arrow. The guide is normally driven at a speed corresponding to 25 reciprocations in each direction during 25½ rotations of the spindle. Starting at $c^1$, the coil goes to $c^2$, reverses directions at $c^3$ to $c^4$, reverses again to $c^5$, $c^6$ (which is the same as $c^5$) to $c^7$, and reverses again at $c^8$. At $c^9$, the guide is stopped, and the material winds straight around the spindle to $c^{10}$, where movement of the guide is resumed. This movement continues to $c^{11}$, reverses to $c^{12}$, $c^{13}$ (which is the same as $c^{12}$), continues to $c^{14}$, reverses at $c^{15}$ and continues to $c^{16}$. The regular laying of successive coils then continues until point $d^1$ is reached, at which point the guide is moving towards the left. The winding goes to $d^2$, where it reverses, then to $d^3$ and again reverses, to $d^4$, $d^5$ (which is the same as $d^4$), to $d^6$ where it reverses, then to $d^7$ where movement of the guide is stopped. Again the material is laid straight around the spindle to $d^8$, where movement of the guide is resumed. The material is now laid to $d^9$, reversed to $d^{10}$, $d^{11}$ (which is the same as $d^{10}$), then to $d^{12}$, reversed to $d^{13}$, and reversed again to $d^{14}$.

This creates two valleys extending spirally around the coil. One of these valleys is defined by a first line $c^6$, $c^7$, $c^8$, $c^9$, $c^4$, $c^5$ and by a second line $c^{13}$, $c^{14}$, $c^{15}$, $c^{10}$, $c^{11}$, $c^{12}$. The other valley is defined by a first line $d^5$, $d^6$, $d^7$, $d^3$, $d^4$ and a second line $d^{11}$, $d^{12}$, $d^8$, $d^9$, $d^{10}$. Because cams 140 are 180° apart, these valleys will cross twice at substantially the longitudinal center of the package, forming two holes $c^h$. The inner end $c^e$ of the flexible material is led out through one of these holes, as shown in Fig. 2.

The present invention also contemplates a coil of a type generally similar to that shown in my earlier application referred to above. Such a coil is shown in Fig. 5, and its winding diagram in Fig. 6. This coil has all the cross-overs in substantially one half (the lower half in Fig. 5) of the coil, and the hole $h^h$ is formed between the bights of the successive figure-8 coils, these bights lying in planes forming angles of not over about 90° between them. The free inner end $h^e$ is led out through this hole.

A winding diagram of such a coil is shown in Fig. 6. This is wound with a positive advance, the cross-overs of each layer being mid-way between those of the adjacent layers. The coils of one layer are shown in solid lines and of the other layer in broken lines.

Starting from point $h^0$, $h^1$ (same as $h^0$), with the guide starting to the right, the first layer runs to $h^2$, $h^3$ (same as $h^2$), reverses at $h^4$ to $h^5$, $h^6$ (same as $h^5$), reverses at $h^7$ to $h^8$, $h^9$ (same as $h^8$), reverses at $h^{10}$ to $h^{11}$, $h^{12}$ (same as $h^{11}$), reverses at $h^{13}$ to $h^{14}$, $h^{15}$ (same as $h^{14}$), reverses at $h^{16}$ to $h^{17}$, $h^{18}$ (same as $h^{17}$), reverses at $h^{19}$ to $h^{20}$, $h^{21}$ (same as $h^{20}$), reverses at $h^{22}$ to $h^{23}$, $h^{24}$ (same as $h^{23}$), reverses at $h^{25}$ to $h^{26}$, $h^{27}$ (same as $h^{26}$), reverses at $h^{28}$ to $h^{29}$, $h^{30}$ (same as $h^{29}$), reverses at $h^{31}$ to $h^{32}$, $h^{33}$ (same as $h^{32}$), reverses at $h^{34}$ to $h^{35}$, $h^{36}$ (same as $h^{35}$), reverses at $h^{37}$ to $h^{38}$, $h^{39}$ (same as $h^{38}$), reverses at $h^{40}$ to $h^{41}$, $h^{42}$ (same as $h^{41}$), and reverses at $h^{43}$ to $h^{44}$, $h^{45}$ (same as $h^{44}$). At point $h^{46}$ movement of the guide stops while the spindle continues to turn, laying the material to $h^{47}(k^1)$ and starting the second layer. Resumption of movement of the guide then forms a second layer designated similarly by points $k^2$ to $k^{47}$. At $k^{48}$, movement of the guide is again stopped and the spindle turns to lay the material to $k^{49}$. At this point, movement of the guide is resumed and a third layer like $h^0$ to $h^{47}$ is formed, then another layer $k^1$ to $k^{49}$ and so on.

The package so produced may, if desired, be given some support by a strip of paper, cloth or other suitable material 208 adhesively secured on the outside thereof.

Fig. 8 shows a winding diagram for "one and a half" wind using two interruptions of the shuttle movement and with a positive advance. It will be assumed that the guide is normally driven at a speed corresponding to 72 reciprocations of the guide in each direction for each 217 rotations of the spindle. The spindle is driven in the direction of the arrow. Starting at some point $f^1$, where the shuttle is moving towards the left, the flexible material will be laid to $f^2$, $f^3$ (the same as $f^2$), $f^4$, to $f^5$ where it is reversed, to $f^6$, $f^7$ (the same as $f^6$), $f^8$, is reversed at $f^9$ to $f^{10}$, $f^{11}$ (the same as $f^{10}$) to $f^{12}$. At this point, movement of the guide is stopped and the flexible material is laid straight around the spindle to the point $f^{13}$, where movement of the guide is resumed. The material is then laid to $f^{14}$, $f^{15}$ (the same as $f^{14}$), $f^{16}$, reversed at $f^{17}$ to $f^{18}$, $f^{19}$ (the same as $f^{18}$), $f^{20}$, reversed at $f^{21}$ to $f^{22}$, $f^{23}$ (the same as $f^{22}$) and to $f^{24}$. The regular laying of successive coils continues until the material reaches a point such as $g^1$, where the guide is moving towards the right. The material is then laid to $g^2$, $g^3$ (the same as $g^2$), $g^4$, reversed at $g^5$ to $g^6$, $g^7$ (the same as $g^6$), $g^8$, reversed at $g^9$ to $g^{10}$, $g^{11}$ (the same as $g^{10}$) to $g^{12}$. At this point, movement of the guide is again stopped and the material is laid straight around the spindle to $g^{13}$, where movement of the guide is resumed. The laying of the material is then continued to $g^{14}$, $g^{15}$ (the same as $g^{14}$), $g^{16}$, reversed at $g^{17}$, to $g^{18}$, $g^{19}$ (the same as $g^{18}$), $g^{20}$, reversed at $g^{21}$ to $g^{22}$, $g^{23}$ (the same as $g^{22}$) to $g^{24}$. Regular laying of the coils is then resumed for the remainder of the layer.

The layer so produced has two valleys; one is defined on one side by the line $f^{11}$, $f^{12}$, $f^2$, $f^3$, $f^4$, $f^5$, $f^6$, $f^7$, $f^8$, $f^9$, $f^{10}$, and on the other by the line $f^{23}$, $f^{13}$, $f^{14}$, $f^{15}$, $f^{16}$, $f^{17}$, $f^{18}$, $f^{19}$, $f^{20}$, $f^{21}$, $f^{22}$. The other valley is defined on one side by the line $g^{11}$, $g^{12}$, $g^2$, $g^3$, $g^4$, $g^5$, $g^6$, $g^7$, $g^8$, $g^9$, $g^{10}$ and on the other by the line $g^{23}$, $g^{13}$, $g^{14}$, $g^{15}$, $g^{16}$, $g^{17}$, $g^{18}$, $g^{19}$, $g^{20}$, $g^{21}$, $g^{22}$. These valleys intersect at a number of points, so that several holes are formed. It is preferable to bring out the inner end of the flexible material through one of the holes $f^h$ at the longitudinal center of the package.

Figs. 9 to 11 show a dispensing arrangement embodying a package of the type described herein and utilizing an internal guiding surface, preferably in the form of a tube.

Figs. 9 and 10 show a part composed of a tube 40 having rounded ends, and having secured on one end a plate 42 provided with slots 44. This tube is of greater length than the thickness of the wall of the package 46, which may be of the type shown in Fig. 1, for example, so that when the tube is inserted in the radial hole its inner end, having guiding surface 48, will be located within the spindle core opening at a point spaced inwardly from the inner wall of the package, and preferably between the portion of the inner wall adjacent the hole and the central axis of the package. The inner end of the flexible material, which extends out through the radial hole, is threaded through the tube, which is then inserted through the hole until plate 42 engages the outer surface of the package. Straps 52 of cloth, tape, metal or other suitable material are then passed around the package in the manner shown, and their ends are passed through slots 44 and secured therein. The inner diameter of the tube is substantially greater than the diameter of the flexible material, so that the tube offers only slight resistance to the withdrawal of the flexible material.

A tube so mounted is very effective in facilitating the withdrawal of the flexible material. Without the tube there is some possibility that the internal coils which cross at points near the hole $a^h$ (Fig. 1) may kink at or near the crossing point as they are withdrawn. The guiding surface located inwardly from the inner wall greatly reduces this possibility.

Since the inner coils are withdrawn first, the outer layer remains intact until practically all the flexible material is withdrawn. Thus the package cannot shift around in the holding means when only a part of it has been paid out, and the danger of damage to the package or of its displacement is avoided. Also, the tube protects the flexible material around the hole from injury by the friction of the material being withdrawn through the hole.

Figs. 12 to 14 show another form of dispensing arrangement. In this form, tube 54 (Fig. 12) has secured on one end a plate 56 having outstanding tabs or ears 58. Fig. 13 shows a wrapping sheet 60 having in each end semi-circular notches 62 of smaller diameter than plate 56, and slots 64. This sheet may be of heavy paper, cloth, thin metal or other suitable material. The tube 54 is inserted into the hole of package 66, which may be of the type shown in Fig. 1, until plate 56 engages the outer surface of the package. Tabs 58 are bent up at right angles. Sheet 60 is then wrapped around the package, with slots 64 engaging tabs 58. The tabs 58 are then bent inwardly to hold the sheet in place, with its edges partly overlying plate 56.

One end edge of sheet 60 may be provided with adhesive material, as at 66, so that the sheet will stay in place; or strips or bands 68 of adhesive paper or cloth, or of metal, may be secured around the package.

An enclosed package is shown in Figs. 15 and 16. The package is indicated at 70, with its inner end at $a^e$ and its hole at $a^h$. The guiding member is a tube 72 extending through the hole and having an annular guiding surface 74 at its inner end.

Preferably the package with the tube is enclosed in a box 76 having a removable front wall 78. The tube has a flange 80 adapted to engage the outside of the front wall, through which the tube passes into the package. This flange is held against the front wall by a disc 82 of paper or other suitable material glued to the front wall. In making up this unit, the inner wire end may be inserted through the tube, the package placed in the box 76 so that its hole $a^h$ is centrally located in the open side, and the front wall 78 applied, while the tube is guided through the hole.

The tube in this form acts to keep the hole in the package aligned with the hole in the box, and likewise prevents displacement of the package within the box.

When it is desired to have a long, unbroken length of the flexible material without too large a single package, arrangements such as those shown in Figs. 17 to 21 may be utilized.

Fig. 17 shows a series of packages $84^1$, $84^2$, $84^3$, $84^4$, intended to be drawn off in that order. The package $84^1$ is provided with a tube 86 in its hole $a^h$. The inner end $a^e$ of the material package 84¹ extends out through tube 86 for withdrawal. The outer end $a^o$ of package 84¹ extends through the hole of package 84², and has as its continuation the inner end of the material in this package. The other packages are similarly connected, up to the free outer end $a^o$ of the last package in the series, 84⁴.

In withdrawing material from such an arrangement, the end $a^e$ of package 84¹ is withdrawn through tube 86 until that package is exhausted. Then tube 86 is inserted into the hole of package 84², and withdrawal from that package begins. This procedure is continued until the supply of flexible material is all withdrawn.

A series of packages of this type may be formed on a machine embodying the principles of the machine shown in my prior application referred to above.

Fig. 18 shows a series of packages 88¹, 88², 88³ each of the type shown in Fig. 5. Package 88¹ has its inner end $h^e$ coming out through the hole $h^h$, and its outer end $h^o$ extending into the hole of the next package 88², and having as its continuation the inner end of the material of such second package. The outer end $h^o$ of the last package of the series, 88³, is the other terminal of the flexible material.

In Fig. 19, packages 90¹, 90², 90³ and 90⁴ are shown, each provided with a tube 92 in its hole. The inner end $a^e$ of package 90¹ comes out through its tube for withdrawal. The outer end of the material in each package extends back into the package through the hole, outside the tube, then out through the tube and into the hole of the next package, having as its continuation the inner end of the material in the next package. The other terminal of the material is the outer end $a^o$ of package 90⁴.

With this arrangement, package 90¹ is first withdrawn. At the end of its withdrawal, the last loop pulls out through tube 92, which then drops off, and withdrawal of the remaining packages follows.

Fig. 20 shows a series of packages 94¹, 94², 94³, 94⁴, 94⁵ of the type shown in Fig. 5. In this form, the outer end $h^o$ of each package extends into the spindle core opening of the next succeeding package and has as its continuation the inner end of the material of the next package. The inner end $a^e$ of the material of the first package 94¹ extends out through its hole and then into each succeeding package at the core opening thereof and out of such package by its hole $h^h$, extending successively through all the packages. When end $a^e$ is withdrawn, the material is pulled through all the rest of the packages until package 94¹ is exhausted, whereupon package 94² is drawn off and so successively until the material is used up. The outer end $h^o$ of package 94⁵ is the other terminal of the flexible material.

In Fig. 21, several packages 96¹, 96², 96³, 96⁴ of the type shown in Fig. 1 are diagrammatically represented, each provided with a tube 98. Each tube extends into the spindle core opening of the next succeeding package, and the packages are held in this position in any suitable manner. The inner end of the package 96¹ extends through the spindle core holes and the tubes of the succeeding packages, ending at $a^e$. The outer end $a^o$ of the flexible material in each package extends inwardly through the hole $a^h$ of such package outside the tube and then outwardly through the tube into the core hole of the next package, connecting with the beginning end of the innermost layer of such package. The outer end $a^o$ of the final package 96⁴ is left free.

With such an arrangement, as the free end $a^e$ is pulled it will withdraw the innermost layer of package 96¹ through all the succeeding packages, and then the following layers from the inside out. When the first package is exhausted, the last loop will be drawn through the tube 98 of that package, which will then cease to play any part, and the innermost coil of package 96² will be withdrawn. This will continue until all the packages are used up.

Figure 22:
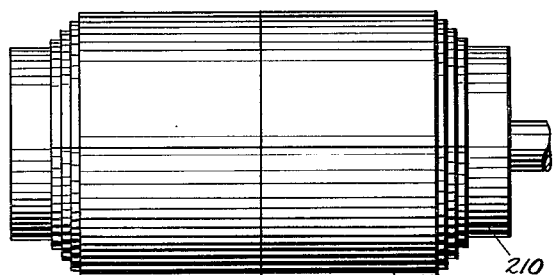
Fig. 22 shows in elevation a spindle prepared for the winding of a special type of package with rounded ends.
Figure 23:
Fig. 23 is a cross-section through a part of the arrangement of Fig. 22.

The winding diagrams show actually the relative movement of the guide and spindle. In the "half" wind diagram of Fig. 4, the result will be a ball as shown in Fig. 3, the parts on the outside of the two vertical broken lines actually forming around the ends of the package and not in cylindrical layers. In the production of such a package, the procedure illustrated in Figs. 22 to 24 may be advantageous. In these, the spindle 210 is first supplied with one or more layers of tape or ribbon 212, which may be of a portion of the width of the spindle, as shown, or may be of the full width of the spindle, and may be applied circumferentially around it. The package 214 is then wound on this tape, and the package and tape are removed from the spindle. The inner end 216 of the tape is then pulled out through the core opening, leaving the finished package ready for the withdrawal of the inner end $c^e$ of the flexible material through the radial hole $c^h$ therein.

Figure 24:
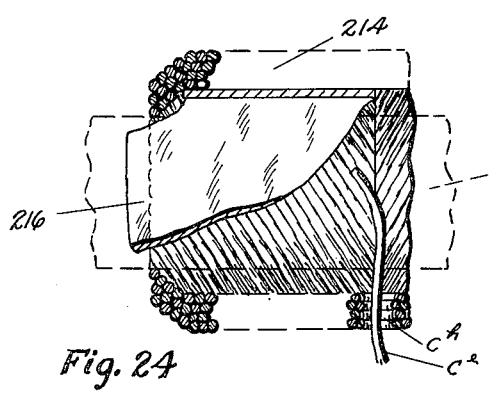
Fig. 24 is a cross-section through a part of the package so produced.
Figure 25:
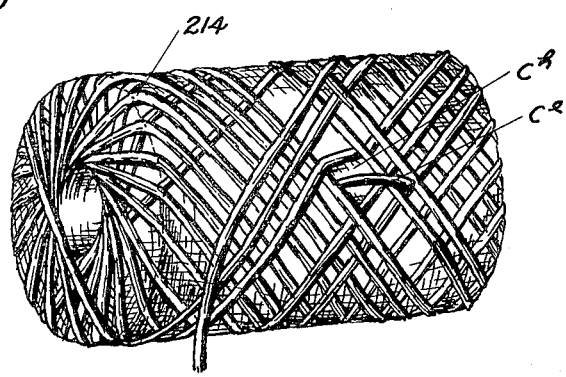
Fig. 25 is a side elevation of a layer of this package.

This method can be used either for a "half-wind" package, as shown in Figs. 3 and 4, or for packages of a higher number of winds. The result is that, as represented by the fact that the diagrams show some vertical distance (that is, distance around the spindle) between the end of one coil and the beginning of the next, there is a crossing over of the coils and the package has a rounded end, as shown in Figs. 24 and 25 for a one-wind having a diagram like that of Fig. 2. This formation in no way reduces the effectiveness of the withdrawal, and has the advantage of adding to the self-sustaining properties of the package.

Figure 26:
Figs. 26 and 27 are explanatory diagrams.
Figure 27:
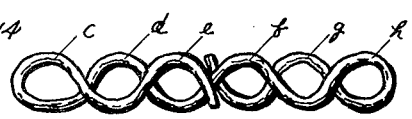

The term "figure 8" is intended to include both simple (or normal) and multiplex figure 8's. The term "multiplex figure 8" is intended to designate windings in which there are two or more crossing loops on each side of the central point, rather than only one loop as in a normal figure 8. Fig. 26 shows a normal figure 8, having bights $a$ and $b$. Fig. 27 shows a multiplex figure 8, having loops $c$, $d$, $e$ on one side of the center and loops $f$, $g$, $h$ on the other side.

While I have described herein some embodiments of my invention, I wish it to be understood that I do not intend to limit myself thereby except within the scope of the claims hereto or hereinafter appended.

I claim:

1. A package of flexible material comprising a plurality of layers surrounding a central core space and each composed of helical coils laid alternately from end to end of the package, all the alternate coils having the same direction in each layer being successively angularly displaced around the package so as to lie parallel, the spaces between two of the alternate coils in each direction in each layer being substantially greater than the space between at least the greater part of the remaining coils in such direction in that layer and being at least as great as the cross-sectional dimensions of the flexible material, a crossing point of such greater spaces forming a hole through the layer, the holes in successive layers being aligned, whereby the inner end of the flexible material may be drawn out through such aligned holes.

2. A package as claimed in claim 1 in which the core space is unobstructed.

3. A package as claimed in claim 2 having a member extending through said holes into said core space, said member having an annular guiding surface within the core space lying a substantial distance within the innermost layer.

4. A package as claimed in claim 1 in which said layers are self-sustaining.

5. A package of flexible material comprising a plurality of layers surrounding a central core space and composed of helical coils laid alternately from end to end of the package with each coil crossing the preceding coil at least once at a point intermediate the ends of the package, the crossing points being successively angularly spaced around the package, so that all the alternate coils having the same direction lie parallel, the spaces between two of the alternate coils in each direction in each layer being substantially greater than the space between at least the greater part of the remaining coils in such direction in such layer and being at least as great as the cross-sectional dimensions of the flexible material, a crossing point of such greater spaces forming a hole through the layer, the holes in successive layers being aligned, whereby the inner end of the flexible material may be drawn out through such aligned holes.

6. A package as claimed in claim 5, in which the core space is unobstructed.

7. A package as claimed in claim 5, in which each coil comprises two sections each including at least one loop, the sections having opposite and equal twist, and the aligned holes being positioned between such sections.

8. A package as claimed in claim 5 having a member extending through said holes into said core space, said member having an annular guiding surface within the core space lying in a substantial distance within the innermost layer.

9. A package of flexible material having an opening therethrough and comprising a series of coils each surrounding said opening and laid beside and upon each other to form the package, a member extending into said package through said coils transversely to the axis of the opening, said member having an annular guiding surface within the opening substantially at the center of said opening, whereby the free inner end of the material may be drawn out through said member.

10. A package as claimed in claim 9 in which said member has an opening of substantially greater area than the cross-section of the flexible material.

11. A package as claimed in claim 9 in which said member is a tube.

12. A package as claimed in claim 5, in which all of said crossing points lie within an angle of not more than about 180° around the axis of the package.

13. A package as claimed in claim 12, in which each coil comprises two sections each including at least one loop, the sections having opposite and equal twist, and the aligned holes being positioned between such sections.

14. A package as claimed in claim 1, in which said core space is of less diameter at at least one end than intermediate its ends.

15. A package as claimed in claim 14, in which the coils form around the ends of the package to restrict the diameter of the core space at its ends.

16. A package as claimed in claim 9 in which each of said coils includes at least one figure 8.

17. A package of flexible material having an opening therethrough and comprising a series of coils each surrounding said opening and laid beside and upon each other to form the package, a member extending into said package through said coils transversely to the axis of the opening, said member having an annular guiding surface within the opening spaced inwardly from the innermost coil, whereby the free inner end of the material may be drawn out through said member, and holding means engaging the outermost coils of the package, said member extending through and being secured by said holding means.

18. A package of flexible material having an opening therethrough and comprising a series of coils each surrounding said opening and laid beside and upon each other to form the package, a member extending into said package through said coils transversely to the axis of the opening, said member having an annular guiding surface within the opening spaced inwardly from the innermost coil, whereby the free inner end of the material may be drawn out through said member, and a container having walls engaging the outermost coils of the package, said member extending through one of said walls.

19. In a combination as claimed in claim 18, means securing the member in said wall.

20. In a combination as claimed in claim 19, said member being a tube.

21. In a combination as claimed in claim 20, each of said coils including at least one figure 8, the angular spacing between said coils being increased at one point to form such opening.

WALTER P. TAYLOR, Jr.

References Cited in the file of this patent

UNITED STATES PATENTS

| Number | Name | Date |
|---|---|---|
| 395,636 | Stieglitz | Jan. 1, 1889 |
| 579,054 | Garsed | Mar. 16, 1897 |
| 954,344 | Rhoades | Apr. 5, 1910 |
| 963,114 | Berry | July 5, 1910 |
| 1,364,987 | Fleming | Jan. 11, 1921 |
| 1,592,432 | Barry | July 13, 1926 |
| 1,698,610 | Schmiege | Jan. 8, 1929 |
| 2,035,930 | Strong | Mar. 31, 1936 |
| 2,095,765 | Schenck | Oct. 12, 1937 |
| 2,231,092 | Schenck | Feb. 11, 1941 |
| 2,466,852 | Keith | Apr. 12, 1949 |
| 2,509,487 | Davis | May 30, 1950 |

FOREIGN PATENTS

| Number | Country | Date |
|---|---|---|
| 85,289 | Germany | Feb. 24, 1896 |
| 407,786 | Great Britain | Mar. 29, 1934 |
| 821,157 | France | Aug. 17, 1937 |